United States Patent Office 3,840,608
Patented Oct. 8, 1974

3,840,608
HYDROGENATION OF AROMATIC HYDROCARBONS
Robert M. Suggitt, Wappingers Falls, and Norman D. Carter, Poughkeepsie, N.Y., assignors to Texaco Inc., New York, N.Y.
No Drawing. Filed June 27, 1972, Ser. No. 266,838
Int. Cl. C07c 5/10
U.S. Cl. 260—667    11 Claims

ABSTRACT OF THE DISCLOSURE

Aromatic hydrocarbons are hydrogenated to the corresponding saturated cyclic hydrocarbons with high selectivity to produce a substantially pure product by carrying out the hydrogenation in the presence of a volatile basic nitrogen compound.

---

This invention relates to the hydrogenation of aromatic compounds. More particularly, it is concerned with the production of cyclohexane from benzene. In its most specific aspect, it is concerned with the production of cyclohexane in a purity of at least 99.75%.

The hydrogenation of aromatic compounds is well known and has been disclosed thoroughly in the prior art. In the earlier processes an aromatic hydrocarbon such as benzene was contacted with hydrogen in the presence of a hydrogenation catalyst at elevated temperature and pressure with good conversion of benzene to cyclohexane. However, side reactions such as cracking with the production of normal hexane, isomerization with the production of methyl cyclopentane and, in the case of excessively high temperatures, cracking with the formation of $C_5$ and lighter hydrocarbons took place. More recently, for the use of cyclohexane as an intermediate for the production of other chemicals it has become desirable to obtain the cyclohexane in as high a purity as possible. It was subsequently found that to this end it was necessary to control the reaction temperature in known processes to a maximum of about 480–490° F. as otherwise the various undesirable side reactions would take place resulting in a product of lower purity. Since hydrogenation is a highly exothermic reaction, to maintain the reaction temperature below 490° F. various devices were used such as multiple catalyst beds with inter-bed heat exchange and cooling of the reactant stream, tubular reactors in which the catalyst was placed in tubes surrounded by a cooling medium or product cyclohexane injection into the reactant stream at various points for cooling purposes. Eventually the preferred procedure came to be the use of multiple catalyst beds with the introduction of a mixture of the benzene feed and cyclohexane product into the first bed of a multiple catalyst bed unit and with the introduction of product cyclohexane between the beds for the purpose of cooling the reactant stream to maintain it below 490° F. This unfortunately meant that a large volume of material was being passed through the catalyst bed, only a small portion of which was actually being hydrogenated, in effect resulting in a low space velocity. The temperature restriction was also an undesirable control on reaction conditions.

It is therefore an object of the present invention to provide a novel process for the hydrogenation of aromatic compounds. It is a further object of the present invention to convert benzene, toluene and xylenes to the corresponding saturated cyclic hydrocarbons. It is a further object of the present invention to produce saturated cyclic compounds of a purity of at least 99.5%. Still another object is to convert unsaturated aromatic hydrocarbons to the corresponding saturated hydrocarbons at temperatures between about 500 and 675° F. with a minimum production of undesirable by-products. These and other objects will be obvious to those skilled in the art from the following disclosure.

According to our invention saturated cyclic hydrocarbons are produced from the corresponding aromatic compounds by contacting the aromatic compound with hydrogen in the presence of a hydrogenation catalyst and in the presence of between 10 and 1000 p.p.m. basic nitrogen based on the weight of the aromatic compound to be hydrogenated. We have found that when small amounts of a volatile basic nitrogen compound are added to the feed the side reactions which cause loss of selectivity are suppressed and higher operating temperatures are permissible for the production of high purity products than was possible using the processes of the prior art. As a consequence high production rates and high purity products are obtainable.

The hydrogen used in the process of our invention when product purity of at least 99% is desired should be at least 90% and preferably at least 98%. Electrolytic hydrogen or catalytic reformer by-product hydrogen purified by cryogenic means is satisfactory. Hydrogen to benzene mole ratios of 5–10 may be used with mole ratios of 6–8 being preferred. The pressure of the hydrogenation zone may range up to about 1000 p.s.i.g. or higher with preferred pressure lying within the range of about 350–800 p.s.i.g. The temperature within the reaction zone should be high enough to initiate the reaction effect substantial saturation of the aromatic hydrocarbon. Ordinarily the minimum temperature will be about 250° F. and the maximum temperature about 675° F. Preferred temperatures following the procedure of our invention will range between about 400 and 650° F.

The catalysts used in the process of our invention generally comprise a Group VIII metal as the hydrogenating component on a refractory oxide support. Particularly suitable Group VIII metals are nickel and platinum. When nickel is the catalytic metal it is generally present in the catalyst in an amount between about 25 and 60% by weight preferably between about 30 and 45%. When platinum is the catalytic metal it is generally present in the catalyst in an amount between about 0.375 and 2% by weight preferably between about 0.6 and 1.0% by weight. The catalytic metal is supported on a base comprising a refractory inorganic oxide such as silica, alumina, magnesia and zirconia and the like or their mixtures, a preferred support being alumina and still more preferably gamma alumina.

The aromatic hydrocarbon charge should be substantially pure, preferably as pure as possible such as at least 99% in order to obtain a high purity product. Preferably to absorb some of the heat of the reaction, saturated product is introduced with the aromatic hydrocarbon charge. In this way normally liquid effluent from the reaction zone will be substantially completely the desired product so that the pure product can be obtained directly from the hydrogenation zone simply by flashing off the hydrogen and without further purification.

The basic nitrogen compound is one which is vaporous under the reaction conditions. Suitable basic nitrogen compounds include ammonia and lower alkyl amines such as methyl amine, ethyl amine, propyl amine and ethylene diamine and amine precursors such as acetonitrile. Cyclic amines such as aniline and cyclohexylamine may also be used. These compounds may be present in an amount to supply between about 10 and 1000 p.p.m. basic nitrogen by weight of the aromatic hydrocarbon charge. When the basic nitrogen compound is ammonia it may be present in an amount preferably ranging from about 100 to 1000 p.p.m. and when an organic amine or amine precursor is used it may be present in an amount preferably between about 30 and 500 p.p.m. Heterocyclic compounds containing ring nitrogen, even although basic, have been found unsatisfactory for the purposes of our invention.

The following examples are submitted for illustrative purposes only:

Data for three runs in which the feed and hydrogen were passed over a fixed bed of particulate catalyst are tabulated below. In Run 1 the catalyst contained 0.6 wt. percent platinum on eta alumina. In Run 2 the catalyst contained 0.75 wt. percent platinum on gamma alumina and in Run 3 the catalyst contained 35 wt. percent nickel on alumnia. In each case the total pressure was 500 p.s.i.g. and the hydrogen to benzene mole ratio was approximately 7:1. High purity (essentially 100%) hydrogen was employed. For each of Runs 1 and 2 the catalyst was evaluated initially on two feeds of appproximately 27 and 37% benzene and the balance cyclohexane. Continuing with the higher benzene content feed small amounts of nitrogen-containing compounds were dissolved in the feed which was then introduced into the unit under substantially the same conditions that prevailed just prior to converting to the nitrogen-containing feed. In the tables, the feed, space velocity in terms of volume of feed per volume of catalyst per hour, feed inlet and outlet temperatures and hours on stream are listed. The analyses of the products are also listed with those of the respective feeds being set forth at the bottom of each table. These analyses were made by gas chromatography and are reported as area percent. Data for Runs 1, 2 and 3 are tabulated in Tables I, II and III respectively.

TABLE I

| Sample No.: | Hours on stream | | Feed | LHSV of feed | Catalyst inlet | Temp. (° F.) outlet | Hexanes | Methyl cyclo-pentane | Cyclo-hexane | Benzene |
|---|---|---|---|---|---|---|---|---|---|---|
| | This feed | Total (all feeds) | | | | | | | | |
| 1 | 12 | 12 | A | 4 | 284 | 535 | 0.04 | 0.10 | 99.69 | 0.17 |
| 2 | 16 | 16 | A | 4 | 330 | 590 | 0.10 | 0.16 | 99.62 | 0.12 |
| 3 | 4 | 22 | B | 4 | 346 | 658 | 0.62 | 0.51 | 98.80 | 0.07 |
| 4 | 6 | 24 | B | 4 | 348 | 651 | 0.60 | 0.57 | 98.77 | 0.06 |
| 5 | 8 | 26 | B | 4 | 300 | 621 | 0.41 | 0.51 | 98.87 | 0.21 |
| 6 | 12 | 30 | B | 4 | 302 | 643 | 0.21 | 0.41 | 99.31 | 0.08 |
| 7 | 6 | 36 | C | 4 | 299 | 637 | 0.04 | 0.07 | 99.89 | N.D. |
| 8 | 12 | 42 | C | 3.5 | 310 | | 0.02 | 0.06 | 99.92 | N.D. |
| 9 | 6 | 48 | D | 4 | 290 | | 0.03 | 0.07 | 99.90 | N.D. |
| 10 | 12 | 54 | D | 4 | 302 | 645 | 0.04 | 0.06 | 99.90 | N.D. |
| 11 | 16 | 58 | D | 4.3 | 247 | 546 | 0.04 | 0.06 | 99.90 | N.D. |
| 12 | 4 | 64 | B | 4.5 | 246 | 495 | 0.04 | 0.06 | 99.90 | N.D. |
| 13 | 8 | 68 | B | 4.5 | 250 | | 0.03 | 0.06 | 99.91 | N.D. |

| Feed: | | | | | | | | | | |
|---|---|---|---|---|---|---|---|---|---|---|
| A | | | | | | | 0.03 | 0.06 | 71.94 | 27.97 |
| B | | | | | | | 0.03 | 0.05 | 63.31 | 36.61 |
| C | Feed B plus 200 p.p.m. N present as ethylene diamine. | | | | | | | | | |
| D | Feed B plus 100 p.p.m. N present as ethylene diamine. | | | | | | | | | |

NOTE.—N.D.=None detected.

TABLE II

| Sample No.: | Hours on stream | | Feed | LHSV of feed | Catalyst inlet | Temp. (° F.) outlet | Hexanes | Methyl cyclo-pentane | Cyclo-hexane | Benzene |
|---|---|---|---|---|---|---|---|---|---|---|
| | This feed | Total (all feeds) | | | | | | | | |
| 1 | 4 | 4 | A | 5.4 | 206 | 336 | 0.028 | 0.050 | 98.27 | 1.65 |
| 2 | 6 | 6 | A | 4.0 | 208 | 294 | 0.025 | 0.049 | 97.66 | 2.67 |
| 3 | 10 | 10 | A | 4.0 | 249 | 386 | 0.028 | 0.050 | 99.72 | 0.20 |
| 4 | 12 | 12 | A | 4.2 | 249 | 378 | 0.025 | 0.051 | 98.90 | 1.02 |
| 5 | 16 | 16 | A | 5.7 | 244 | 400 | 0.027 | 0.051 | 99.27 | 0.65 |
| 6 | 18 | 18 | A | 6 | 246 | 404 | 0.027 | 0.051 | 98.96 | 0.76 |
| 7 | 4 | 22 | B | 6 | 246 | 480 | 0.037 | 0.049 | 98.11 | 1.79 |
| 8 | 6 | 24 | B | 6 | 248 | 480 | 0.029 | 0.046 | 98.86 | 1.06 |
| 9 | 10 | 28 | B | 6 | 304 | 649 | 0.262 | 0.220 | 99.42 | 0.089 |
| 10 | 12 | 30 | B | 6 | 311 | 675 | 0.250 | 0.219 | 99.46 | 0.067 |
| 11 | 4 | 34 | C | 6 | 311 | 674 | 0.111 | 0.062 | 99.78 | 0.045 |
| 12 | 8 | 38 | C | 6 | 310 | 662 | 0.111 | 0.063 | 99.76 | 0.056 |
| 13 | 4 | 42 | B | 6 | 315 | 674 | 0.124 | 0.090 | 99.70 | 0.083 |
| 14 | 6 | 44 | B | 6 | 310 | 669 | 0.127 | 0.105 | 99.73 | 0.034 |
| 15 | 4 | 48 | D | 6 | 310 | 668 | 0.101 | 0.068 | 99.83 | N.D. |
| 16 | 8 | 52 | D | 6 | 311 | 672 | 0.089 | 0.067 | 99.84 | N.D. |
| 17 | 4 | 56 | E | 6 | 314 | 676 | 0.086 | 0.067 | 99.84 | N.D. |
| 18 | 6 | 58 | E | 6 | 314 | 674 | 0.086 | 0.068 | 99.84 | N.D. |

| Feed: | | | | | | | | | | |
|---|---|---|---|---|---|---|---|---|---|---|
| A | | | | | | | 0.029 | 0.049 | 73.00 | 26.92 |
| B | | | | | | | 0.028 | 0.044 | 63.16 | 36.76 |
| C | Feed B plus 1,000 p.p.m. N as ammonia[1] | | | | | | 0.027 | 0.044 | 63.18 | 36.74 |
| D | Feed B plus 100 p.p.m. N present as acetonitrile. | | | | | | | | | |
| E | Feed B plus 100 p.p.m. N present as ethylenediamine[2] | | | | | | 0.027 | 0.044 | 63.17 | 36.75 |

[1] Analysis=0.10% basic N.  [2] Analysis=97 p.p.m. basic N.

| Sample No.: | Feed | | Hours on stream | | Inlet | Outlet (maximum) | Hexanes | Methyl-cyclo-pentane | Cyclo-hexane | Benzene |
|---|---|---|---|---|---|---|---|---|---|---|
| | Ident. | LHSV | This feed | Total (all feeds) | | | | | | |
| 1 | A | 4 | 4 | 4 | 242 | 410 | 0.045 | 0.080 | 99.87 | N.D. |
| 2 | A | 4 | 10 | 10 | 284 | 468 | 0.082 | 0.147 | 99.76 | N.D. |
| 3 | B | 4 | 4 | 16 | 288 | 516 | 0.166 | 0.212 | 99.60 | N.D. |
| 4 | B | 4 | 6 | 18 | 284 | 470 | 0.088 | 0.099 | 99.80 | N.D. |
| 5 | B | 4 | 8 | 20 | 275 | 460 | 0.055 | 0.070 | 99.87 | N.D. |
| 6 | B | 4 | 10 | 22 | 284 | 465 | 0.045 | 0.070 | 99.88 | N.D. |
| 7 | B | 4 | 16 | 28 | 308 | 567 | 0.587 | 0.318 | 98.88 | N.D. |
| 8 | B | 4 | 20 | 32 | 306 | 556 | 0.384 | 0.244 | 99.25 | N.D. |
| 9 | B | 4 | 24 | 36 | 314 | 580 | 0.538 | 0.319 | 98.96 | N.D. |

| Feed: | | | | | | | | | | |
|---|---|---|---|---|---|---|---|---|---|---|
| A | | | | | | | 0.033 | 0.058 | 71.49 | 28.41 |
| B | Contains 100 p.p.m. N present as ethylenediamine | | | | | | 0.035 | 0.058 | 71.30 | 28.60 |

With respect to Runs 1 and 2, when the exit temperatures (Maximum temperatures) of the catalyst bed are less than 500° F. (Table II samples 1-8) there is no significant increase in impurity content (hexanes and methylcyclopentane) over the amounts present in the feed. When the maximum temperature of the catalyst exceeds 500° F. and in particular exceeds 550° F., the amounts of methylcyclopentane and hexanes increase substantially. For example at 600 to 650° F. (Table I, samples 3-6 and Table II, samples 9 and 10), the methylcyclopentane content in the product rises from 2 to 8 times the amount in the feed. Likewise the hexanes increase significantly over the content of the feed.

The increase in impurity content is slightly greater for the eta alumina-based platinum catalyst than the gamma alumina-based platinum catalyst under similar temperature conditions.

The effect of adding a small amount of aliphatic amine to the feed is illustrated by reference to Table I. Without changing any other condition the addition of 200 p.p.m. nitrogen present as ethylenediamine reduced the impurity content of the product to essentially that of the feed (that is virtually no new production of hexanes and methylcyclopentane). At the same time the benzene conversion increased so that no benzene could be detected in the product (less than 50 p.p.m.).

higher operating temperatures permit higher rates of conversion which means that higher concentrations of benzene, for example, 37% in the feed as compared to 15-20% in the prior art can be used and at the same time higher feed space velocities such as 6 v./v./hr. compared to 3 of the prior art may be used, in effect doubling the throughput of the benzene.

The addition of the basic nitrogen moderators need not be continuous but may be intermittent. The effect lasts for several hours as shown in Table I.

With respect to Run 3, the data in Table III show that the addition of ethylene diamine does inhibit the formation of hexanes and methylcyclopentane at 470° F. However, the presence of ethylene diamine at a nitrogen concentration of 100 p.p.m. is not effective above 500° F. The selectivity of the nickel catalyst is improved by ethylene diamine addition at temperatures below 500° F. However, the impurity-forming inhibiting effect while present is generally not sufficient at temperatures above 500° F. to assure high purity cyclohexane.

Advantageously, the noble metal catalyst may also contain from about 0.01 to about 5% by weight alkali metal oxide. Run 4 was a substantial duplication of Run 1 with the exception that 0.5 wt. percent $K_2O$ was added to the catalyst. Data on the feeds, products and reaction conditions are set forth below in Table IV.

TABLE IV

| | Feed | | Hours on stream | | Catalyst bed temp. (°F.) | | | Methyl-cyclo-pentane | Cyclo-hexane | Benzene |
|---|---|---|---|---|---|---|---|---|---|---|
| | Ident. | LHSV | This feed | Total (all feeds) | Inlet | Outlet or (maximum) | Hexanes | | | |
| Sample No.: | | | | | | | | | | |
| 1 | A | 4 | 4 | 4 | 307 | 551 | 0.045 | 0.072 | 99.88 | N.D. |
| 2 | A | 4 | 10 | 10 | 337 | 611 | 0.049 | 0.074 | 99.87 | N.D. |
| 3 | B | 4 | 4 | 16 | 341 | 658 | 0.090 | 0.104 | 99.80 | N.D. |
| 4 | B | 6 | 10 | 22 | 337 | 690 | 0.111 | 0.114 | 99.65 | 0.12 |
| 5 | C | 6 | 4 | 28 | 347 | 695 | 0.086 | 0.096 | 99.70 | 0.11 |
| 6 | C | 3 | 12 | 36 | 347 | 674 | 0.045 | 0.083 | 99.87 | N.D. |
| 7 | C | 4 | 16 | 40 | 344 | 680 | 0.048 | 0.085 | 99.87 | N.D. |
| 8 | C | 4 | 20 | 44 | 307 | 642 | 0.049 | 0.078 | 99.87 | N.D. |
| 9 | C | 4 | 24 | 48 | 304 | 643 | 0.041 | 0.074 | 99.88 | N.D. |
| 10 | C | 4 | 28 | 52 | 256 | 543 | 0.034 | 0.064 | 99.90 | N.D. |
| 11 | B | 4 | 6 | 60 | 340 | 675 | 0.044 | 0.088 | 99.87 | N.D. |
| 12 | B | 4 | 10 | 64 | 352 | 677 | 0.045 | 0.104 | 99.85 | N.D. |
| 13 | B | 4 | 14 | 68 | 354 | 674 | 0.050 | 0.109 | 99.84 | N.D. |
| 14 | D | 4 | 4 | 72 | 352 | 681 | 0.046 | 0.087 | 99.86 | N.D. |
| 15 | E | 4 | 12 | 88 | 345 | 683 | 0.040 | 0.072 | 99.89 | N.D. |
| Feed: | | | | | | | | | | |
| A | | | | | | | 0.031 | 0.060 | 72.03 | 27.88 |
| B | | | | | | | 0.029 | 0.056 | 63.12 | 36.79 |
| C | Contains 50 p.p.m. N as ethylenediamine | | | | | | 0.030 | 0.057 | 62.76 | 37.15 |
| D | Contains 100 p.p.m. N as ethylenediamine | | | | | | 0.030 | 0.056 | 63.08 | 36.83 |
| E | Contains 100 p.m.p. N as ethylenediamine | | | | | | 0.030 | 0.048 | 62.93 | 36.99 |

Referring also to Table I it is seen that 100 p.p.m. N is equally effective and that the moderating effect of the nitrogen continues for at least 8 hours after the nitrogen addition is stopped.

Referring to Table II it is seen that ammonia at 1000 p.p.m. and acetonitrile (a precursor to ethylamine) at 100 p.p.m. N are effective. However, ethylenediamine at 100 p.p.m. N is slightly more effective.

Analyses of the products indicated less than 2 p.p.m. basic nitrogen to be present. The organic amines strongly sorb on the catalyst and only break down into light gases that exit with the hydrogen off-gas. The appearance of amine in the liquid cyclohexane product is indicative that the rate of addition of amine is too high and thus may be used as a monitoring of the product for basic nitrogen to control the rate of addition to the unit.

Runs 1 and 2 show that the addition of the light alkyl amines (or their precursors) or ammonia suppressed unwanted side reactions without significantly affecting benzene hydrogenation. As a result high purity cyclohexane was formed under more severe conditions and higher rates of conversion were permissible with less need to control maximum temperature.

The use of basic nitrogen moderators permits the use of temperatures of as high as 650° F. and higher whereas in the absence of the moderators the maximum allowable temperature for high purity product is about 500° F. The The improved selectivity from this combination of alkali metal added to the catalyst and basic nitrogen added to the feed, particularly at high temperatures can be seen in Samples No. 6 and 7. It can also be seen that withdrawal of the ethylene diamine resulted in a gradual reduction in selectivity (Samples No. 11, 12 and 13) but that restoration of the basic nitrogen in the feed resulted in restored selectivity (Samples No. 14 and 15).

As in the other examples, substantially pure product is obtained by the simple expedient of cooling the hydrogenation zone effluent and flashing off gaseous material. The remaining liquid product needs no further purification. In this way substantially pure material is obtained as a direct product of the hydrogenation.

The expression in the tables "none detected" or its abbreviation "N.D." indicates that the benzene concentration was less than 50 p.p.m.

Obviously, various modifications of the invention as hereinbefore set forth may be made without departing from the spirit and scope thereof, and therefore, only such limitations should be made as are indicated in the appended claims.

We claim:

1. A process for the production of cyclohexane having a purity of at least 99.5% which comprises forming a mixture consisting essentially of benzene and cyclohexane, passing said mixture in the presence of added hydrogen and in the presence of 10 to 1,000 p.p.m. basic nitrogen based on the weight of benzene into a hydrogenation zone and into contact with a hydrogenation catalyst selected from the group consisting of platinum and nickel supported on a refractory inorganic oxide and containing from 0.1 to 5% by weight alkali metal oxide, said basic nitrogen being supplied by a basic nitrogen compound selected from the group consisting of ammonia, methyl amine, ethyl amine, propyl amine, ethylene diamine, acetonitrile, aniline and cyclohexylamine and separating from the hydrogenation zone effluent, cyclohexane having a purity of at least 99.5%.

2. The process of Claim 1 in which the hydrogenation temperature is between 400 and 675° F.

3. The process of Claim 1 in which the product cyclohexane has a purity of at least 99.75%.

4. The process of Claim 1 in which the temperature of the hydrogenation zone is betwen 500° F. and 675° F. and the catalyst comprises platinum.

5. The process of Claim 1 in which the temperature of the hydrogenation zone is between 400° F. and 550° F. and the catalyst comprises nickel.

6. The process of Claim 1 in which a basic nitrogen compound is introduced continuously into the hydrogenation zone.

7. The process of Claim 1 in which a basic nitrogen compound is introduced intermittently into the hydrogenation zone.

8. The process of Claim 1 in which the nitrogen-containing compound is ethylene diamine.

9. The process of Claim 1 in which the nitrogen-containing compound is acetonitrile.

10. The process of Claim 1 in which the hydrogenation catalyst is platinum.

11. The process of Claim 1 in which the separation consists essentially of cooling the hydrogenation zone effluent and flashing off the gaseous material.

References Cited

UNITED STATES PATENTS

| 3,446,863 | 5/1969 | Steffgen | 260—667 |
| 2,736,689 | 2/1956 | Stuart | 260—667 |
| 3,366,695 | 1/1968 | Lundeen | 260—667 |
| 2,891,097 | 6/1959 | Clingman | 260—667 |
| 2,929,854 | 3/1960 | Wilson | 260—667 |

VERONICA O'KEEFE, Primary Examiner